US012230016B2

(12) United States Patent
Narayanaswamy et al.

(10) Patent No.: US 12,230,016 B2
(45) Date of Patent: Feb. 18, 2025

(54) EXPLANATION OF MACHINE-LEARNED MODELS USING IMAGE TRANSLATION

(71) Applicant: Google LLC, Mountain View, CA (US)

(72) Inventors: Arunachalam Narayanaswamy, Sunnyvale, CA (US); Subhashini Venugopalan, Mountain View, CA (US); Avinash Vaidyanathan Varadarajan, Los Altos, CA (US)

(73) Assignee: Google LLC, Mountain View, CA (US)

( * ) Notice: Subject to any disclaimer, the term of this patent is extended or adjusted under 35 U.S.C. 154(b) by 346 days.

(21) Appl. No.: 17/799,740

(22) PCT Filed: Mar. 3, 2020

(86) PCT No.: PCT/US2020/020773
§ 371 (c)(1),
(2) Date: Aug. 15, 2022

(87) PCT Pub. No.: WO2021/177943
PCT Pub. Date: Sep. 10, 2021

(65) Prior Publication Data
US 2023/0108319 A1  Apr. 6, 2023

(51) Int. Cl.
*G06V 10/776* (2022.01)
*G06V 10/82* (2022.01)

(52) U.S. Cl.
CPC ............ *G06V 10/776* (2022.01); *G06V 10/82* (2022.01)

(58) Field of Classification Search
CPC .... G06V 10/776; G06V 10/82; G06T 7/0012; G06T 2207/20081; G06T 2207/20084; G06T 2207/30004

(Continued)

(56) References Cited

U.S. PATENT DOCUMENTS

| 9,271,133 B2 | 2/2016 | Rodriguez |
| 10,361,802 B1 * | 7/2019 | Hoffberg-Borghesani ................. G06F 3/00 |

(Continued)

FOREIGN PATENT DOCUMENTS

| CA | 3034644 A1 * | 3/2018 | ............. A63F 13/00 |
| CA | 3079209 A1 * | 4/2019 | ........... A61B 5/0261 |
| WO | WO-2010022185 A1 * | 2/2010 | ......... G05D 23/1905 |

OTHER PUBLICATIONS

International Search Report and Written Opinion for Application No. PCT/US20/20773 dated Nov. 9, 2020.

(Continued)

*Primary Examiner* — Mahendra R Patel
(74) *Attorney, Agent, or Firm* — Botos Churchill IP Law (57) ABSTRACT

Systems and methods for identifying visual features that influence a predictive model are provided. The technology employs an image translation function to introduce a visual feature into an image to create a modified image that can be fed to a predictive model. When the predictive model generates a different prediction for a given image than it does for a modified version of that image, the image translation function can then be used to make further modified versions that exaggerate the introduced visual feature. The technology thus aids in identifying visual features that influence the predictive model so that the model's conclusions can be understood, and so that those visual features can be further studied and tested.

20 Claims, 9 Drawing Sheets
(4 of 9 Drawing Sheet(s) Filed in Color)

(58) Field of Classification Search
USPC ...................................................... 455/456.1
See application file for complete search history.

(56) References Cited

U.S. PATENT DOCUMENTS

| | | | | |
|---|---|---|---|---|
| 11,188,795 | B1* | 11/2021 | Lee | G06F 18/217 |
| 2011/0143811 | A1* | 6/2011 | Rodriguez | H04N 1/00244 |
| | | | | 455/556.1 |
| 2014/0080428 | A1* | 3/2014 | Rhoads | H04W 4/70 |
| | | | | 455/88 |
| 2019/0180441 | A1* | 6/2019 | Peng | G06T 7/0016 |
| 2019/0197357 | A1* | 6/2019 | Anderson | G06F 18/217 |
| 2020/0097858 | A1* | 3/2020 | Baikalov | G06F 18/2148 |
| 2020/0184278 | A1* | 6/2020 | Zadeh | G06N 3/044 |
| 2020/0193075 | A1* | 6/2020 | Allen | G06F 17/16 |
| 2020/0302318 | A1* | 9/2020 | Hetherington | G06N 20/20 |
| 2021/0049503 | A1* | 2/2021 | Nourian | G06F 11/3466 |
| 2021/0142161 | A1* | 5/2021 | Huang | G06F 16/212 |
| 2021/0166151 | A1* | 6/2021 | Kennel | G06N 20/00 |
| 2021/0182713 | A1* | 6/2021 | Kar | G06N 20/20 |

OTHER PUBLICATIONS

Weina Jin et al: "Applying Artificial Intelligence to Glioma Imaging: Advances and Challenges", Arxiv.Org, Cornell University Library, 201 Olin Library Cornell University Ithaca, NY 14853, Nov. 28, 2019, XP081541724.
Arrieta, Alejandro Barredo, et al., "Explainable Artificial Intelligence (XAI): Concepts, Taxonomies, Opportunities and Challenges toward Responsible AI", Arxiv.Org, Cornell University Library, 201 Olin Library Cornell University Ithaca, NY 14853, Oct. 22, 2019, XP081519176.
Selvaraju, Ramprasaath R, et al., "Grad-CAM: Visual Explanations from Deep Networks via Gradient-Based Localization", 2017 IEEE International Conference On Computer Vision (ICCV), IEEE, Mar. 21, 2017, pp. 618-626, XP033282917, DOI: 10.1109/ICCV.2017.74 [retrieved on Dec. 22, 2017]cited in the application.
A.V. Varadarajan, et al. Predicting Optical Coherence Tomography-derived Diabetic Macular Edema Grades from Fundus Photographs Using Deep Learning. Nat Commun 11, 130 (2020). 8 Pages.
Alexander Mordvintsev, et al. DeepDream—a code example for visualizing Neural Networks. Google AI Blog, Jul. 1, 2015. Printed from: https://ai.googleblog.com/2015/07/deepdream-code-example-for-visualizing.html on Aug. 31, 2022. 3 Pages.
Amit Dhurandhar, et al. Explanations Based on the Missing: Towards Contrastive Explanations with Pertinent Negatives. NIPS'18: Proceedings of the 32nd International Conference on Neural Information Processing Systems, Dec. 2018, pp. 590-601. 12 Pages.
Andrei Kapishnikov, et al. XRAI: Better Attributions Through Regions. In Proceedings of the IEEE International Conference on Computer Vision, pp. 4948-4957, 2019. 10 Pages.
Andrew Miller, et al. Discriminative Regularization for Latent Variable Models with Applications to Electrocardiography. In Proceedings of the 36th Int'l Conf on Machine Learning, vol. 97, pp. 4585-4594, Jun. 9-15, 2019. 10 Pages.
Aravindh Mahendran, et al. Understanding Deep Image Representations by Inverting Them. arXiv:1412.0035v1, Nov. 26, 2014. 9 Pages.
Avinash Varadarajan, et al. Predicting Optical Coherence Tomography-derived Diabetic Macular Edema Grades from Fundus Photographs Using Deep Learning. arXiv:1810.10342v1, Oct. 18, 2018. 30 Pages.
Avinash Varadarajan, et al. Predicting Optical Coherence Tomography-derived Diabetic Macular Edema Grades from Fundus Photographs Using Deep Learning. arXiv:1810.10342v2, Nov. 19, 2018. 31 Pages.
Avinash Varadarajan, et al. Predicting Optical Coherence Tomography-derived Diabetic Macular Edema Grades from Fundus Photographs Using Deep Learning. arXiv:1810.10342v3, Feb. 9, 2019. 35 Pages.
Avinash Varadarajan, et al. Predicting Optical Coherence Tomography-derived Diabetic Macular Edema Grades from Fundus Photographs Using Deep Learning. arXiv:1810.10342v4, Jul. 31, 2019. 38 Pages.
Casey Chu, et al. CycleGAN, A Master of Steganography. arXiv:1712.02950v1, Dec. 8, 2017. 5 Pages.
Casey Chu, et al. CycleGAN, A Master of Steganography. arXiv:1712.02950v2, Dec. 16, 2017. 6 Pages.
Chun-Hao Chang, et al. Explaining Image Classifiers by Counterfactual Generation. arXiv:1807.08024v1, Jul. 20, 2018. 11 Pages.
Chun-Hao Chang, et al. Explaining Image Classifiers by Counterfactual Generation. arXiv:1807.08024v2, Oct. 11, 2018. 15 Pages.
Chun-Hao Chang, et al. Explaining Image Classifiers by Counterfactual Generation. arXiv:1807.08024v3, Feb. 25, 2019. 19 Pages.
Daniel Smilkov, et al. SmoothGrad: removing noise by adding noise. arXiv:1706.03825v1, Jun. 12, 2017. 10 Pages.
David Bau, et al. Network Dissection: Quantifying Interpretability of Deep Visual Representations. 2017 IEEE Conference on Computer Vision and Pattern Recognition (CVPR) (2017): 3319-3327.
Ian J. Goodfellow, et al. Generative Adversarial Nets. NIPS'14: Proceedings of the 27th International Conference on Neural Information Processing Systems, vol. 2, Dec. 2014, pp. 2672-2680. 9 Pages.
Ishaan Gulrajani, et al. Improved Training of Wasserstein GANs. NIPS'17: Proceedings of the 31st International Conference on Neural Information Processing Systems, Dec. 2017, pp. 5769-5779. 11 Pages.
Jonathan Krause, et al. Grader Variability and the Importance of Reference Standards for Evaluating Machine earning Models for Diabetic Retinopathy. arXiv:1710.01711v1, Oct. 4, 2017. 18 Pages.
Jonathan Krause, et al. Grader Variability and the Importance of Reference Standards for Evaluating Machine earning Models for Diabetic Retinopathy. arXiv:1710.01711v2, May 30, 2018. 23 Pages.
Jonathan Krause, et al. Grader Variability and the Importance of Reference Standards for Evaluating Machine Learning Models for Diabetic Retinopathy. arXiv:1710.01711v3, Jul. 3, 2018. 23 Pages.
Joseph Paul Cohen, et al. Distribution Matching Losses Can Hallucinate Features in Medical Image Translation. arXiv:1805.08841v1, May 22, 2018. 11 Pages.
Joseph Paul Cohen, et al. Distribution Matching Losses Can Hallucinate Features in Medical Image Translation. arXiv:1805.08841v2, Oct. 3, 2018. 11 Pages.
Joseph Paul Cohen, et al. Distribution Matching Losses Can Hallucinate Features in Medical Image Translation. arXiv:1805.08841v3, Oct. 3, 2018. 11 Pages.
Jost Tobias Springenberg, et al. Striving for Simplicity: The All Convolutional Net. arXiv:1412.6806v1, Dec. 21, 2014. 12 Pages.
Jost Tobias Springenberg, et al. Striving for Simplicity: The All Convolutional Net. arXiv:1412.6806v2, Mar. 2, 2015. 14 Pages.
Jost Tobias Springenberg, et al. Striving for Simplicity: The All Convolutional Net. arXiv:1412.6806v3, Apr. 13, 2015. 14 Pages.
Jun-Yan Zhu, et al. Toward Multimodal Image-to-Image Translation. NIPS'17: Proceedings of the 31st International Conference on Neural Information Processing Systems, Dec. 2017, pp. 465-476.
Jun-Yan Zhu, et al. Unpaired Image-to-Image Translation Using Cycle-consistent Adversarial Networks. In Proceedings of the IEEE international conference on computer vision, pp. 2223-2232, 2017. 10 Pages.
Marco Tulio Ribeiro, et al. Why should I trust you ?: Explaining the Predictions of Any Classifier. In Proceedings of the 22nd ACM SIGKDD international conference on knowledge discovery and data mining, pp. 1135-1144. ACM, 2016. 10 Pages.
Matthew D. Zeiler, et al. Visualizing and Understanding Convolutional Networks. Computer Vision—ECCV 2014. ECCV 2014. Lecture Notes in Computer Science, vol. 8689, pp. 818-833. 16 Pages.
Mukund Sundararajan, et al. Axiomatic Attribution for Deep Networks. ICML'17: Proceedings of the 34th International Conference on Machine Learning, vol. 70, pp. 3319-3328. Aug. 2017. 10 Pages.
Pouya Samangouei, et al. ExplainGAN: Model Explanation via Decision Boundary Crossing Transformations. Computer Vision—ECCV 2018. Lecture Notes in Computer Science, vol. 11214, pp. 681-696. 16 Pages.

(56) References Cited

OTHER PUBLICATIONS

Ruth C. Fong, et al. Interpretable Explanations of Black Boxes by Meaningful Perturbation. In Proceedings of the IEEE International Conference on Computer Vision, pp. 3429-3437, 2017. 9 Pages Ruth Fong, et al. Understanding Deep Networks Via Extremal Perturbations and Smooth Masks. arXiv:1910.08485v1, Oct. 18, 2019. 10 Pages.

Ryan Lee, et al. Epidemiology of Diabetic Retinopathy, Diabetic Macular Edema and Related Vision Loss. Eye and vision, 2(1):17, 2015. 25 Pages.

Ryan Poplin, et al. Predicting Cardiovascular Risk Factors from Retinal Fundus Photographs using Deep Learning. arXiv: 1708.09843v1, Aug. 31, 2017. 21 Pages.

Ryan Poplin, et al. Predicting Cardiovascular Risk Factors from Retinal Fundus Photographs using Deep Learning. arXiv: 1708.09843v2, Sep. 21, 2017. 21 Pages.

Ryan Poplin, et al. Prediction of Cardiovascular Risk Factors from Retinal Fundus Photographs via Deep Learning. Nature Biomedical Engineering, 2(3):158, 2018. 9 Pages.

S. P. Harding, et al. Sensitivity and Specificity of Photography and Direct Ophthalmoscopy in Screening for Sight Threatening Eye Disease: The Liverpool Diabetic Eye Study. BMJ, 311(7013):1131-1135, 1995. 5 Pages.

Sarah Mackenzie, et al. SDOCT Imaging to Identify Macular Pathology in Patients Diagnosed with Diabetic Maculopathy by a Digital Photographic Retinal Screening Programme. PloS one, 6(5):e14811, 2011. 6 Pages.

Sarah Wolf. CycleGAN: Learning to Translate Images (Without Paired Training Data). Printed from: https://towardsdatascience.com/cyclegan-learning-to-translate-images-without-paired-training-data-5b4e93862c8d on Jan. 21, 2020. 8 Pages.

Shalmali Joshi, et al. Towards Realistic Individual Recourse and Actionable Explanations in Black-box Decision Making Systems. arXiv:1907.09615v1, Jul. 22, 2019. 19 Pages.

Shusen Liu, et al. Generative Counterfactual Introspection for Explainable Deep Learning. arXiv:1907.03077v1, Jul. 6, 2019. 8 Pages.

Sumedha Singla, et al. Explanation by Progressive Exaggeration. arXiv:1911.00483v1, Nov. 1, 2019. 19 Pages.

Sumedha Singla, et al. Explanation by Progressive Exaggeration. arXiv:1911.00483v2, Nov. 5, 2019. 19 Pages.

Sumedha Singla, et al. Explanation by Progressive Exaggeration. arXiv:1911.00483v3, Feb. 10, 2020. 20 Pages.

Taeksoo Kim, et al. Learning to Discover Cross-Domain Relations with Generative Adversarial Networks. In Proceedings of the 34th International Conference on Machine Learning, Sydney, Australia, PMLR 70, 2017. 9 Pages.

Varun Gulshan, et al. Development and Validation of a Deep Learning Algorithm for Detection of Diabetic Retinopathy In Retinal Fundus Photographs. Jama, 316(22):2402-2410, 2016. 9 Pages.

The First Examination Report for Indian Patent Application No. 202247050019, Jan. 13, 2023.

Vitali Petsiuk, et al. RISE: Randomized Input Sampling for Explanation of Black-box Models. arXiv:1806.07421v1, Jun. 19, 2018. 15 Pages.

Vitali Petsiuk, et al. RISE: Randomized Input Sampling for Explanation of Black-box Models. arXiv:1806.07421v2, Jul. 25, 2018. 17 Pages.

Vitali Petsiuk, et al. RISE: Randomized Input Sampling for Explanation of Black-box Models. arXiv:1806.07421v3, Sep. 25, 2018. 17 Pages.

Yu T. Wang, et al. Comparison of Prevalence of Diabetic Macular Edema Based on Monocular Fundus Photography vs Optical Coherence Tomography. JAMA ophthalmology, 134(2):222-228, 2016. 7 Pages.

Yunjey Choi, et al. Stargan: Unified Generative Adversarial Networks for Multi-domain Image-to-Image Translation. In Proceedings of the IEEE Conference on Computer Vision and Pattern Recognition, pp. 8789-8797, 2018. 9 Pages.

\* cited by examiner

FIG. 1

202 Identify a first class of images associated with a given condition

204 Identify a second class of images associated with a lack of the given condition

206 Train a GAN using the first class and the second class to obtain functions F and G for translating between the first class and the second class, and vice versa, respectively

208 Use function F to translate each of the images in the first class (or an area of each image) to make them appear more like those in the second class

210 Use function G to translate each of the images in the second class (or an area of each image) to make them appear more like those in the first class

EXPLANATION OF MACHINE-LEARNED MODELS USING IMAGE TRANSLATION

CROSS-REFERENCE TO RELATED APPLICATIONS

The present application is a national phase entry under 35 U.S.C. § 371 of International Application No. PCT/US2020/020773, filed Mar. 3, 2020, published in English, the entire disclosure of which is incorporated herein by reference.

BACKGROUND

Deep neural networks are increasingly being used to categorize image data in a variety of fields. For example, in the medical field, neural networks may be trained to differentiate between medical images that show signs of a given medical condition, and those that do not. However, while a neural network may be trained to predict whether an image falls into a particular category, it cannot, without more, identify why it made a particular prediction.

BRIEF SUMMARY

Understanding the reasons behind a machine-learned model's predictions can be important both for assessing the reliability of the prediction (e.g., to confirm that a prediction was not based on noise or artifacts in the image), as well as identifying what features may characterize a given condition or otherwise be associated with that condition. The present technology pertains to using image translation functions to identify visual features that impact a model's predictions, which can be used to identify the nature of change between different classes of images. Such approaches may be beneficial in medical diagnostics as well as other fields that involve image analysis.

In one aspect, the disclosure describes a computer-implemented method. The method comprises: generating, by one or more processors of a processing system, a first prediction based on a first image using a predictive model; generating, by the one or more processors, a second prediction based on a second image using the predictive model, wherein the second image includes a visual feature created by modifying at least a portion of the first image using a translation function, and the second prediction is different than the first prediction; and modifying, by the one or more processors, at least a portion of the second image using the translation function to create a third image in which the visual feature is exaggerated relative to the second image. In some aspects, the method further comprises: modifying, by the one or more processors, at least a portion of the third image using the translation function to create a fourth image in which the visual feature is exaggerated relative to the third image. In some aspects, the translation function is generated using a generative adversarial network. In some aspects, the second image is generated using a generative adversarial network. In some aspects, the predictive model is a neural network. In some aspects, the visual feature included in the second image is created by modifying only a portion of the first image using the translation function. In some aspects, the method further comprises identifying, by the one or more processors, the portion of the first image using a spatial explanation model. In some aspects, the spatial explanation model is a perturbation based model. In some aspects, the spatial explanation model is a backpropagation based model. In some aspects, the method further comprises: generating, by the one or more processors, a third prediction based on an ablated version of the first image using the predictive model, the third prediction being different than the first prediction; and identifying, by the one or more processors, the portion of the first image based on the ablated version of the first image.

In another aspect, the disclosure describes a processing system comprising: a memory; and one or more processors. The one or more processors are configured to: generate a first prediction based on a first image using a predictive model; generate a second prediction based on a second image using the predictive model, wherein the second image includes a visual feature created by modifying at least a portion of the first image using a translation function, and the second prediction is different than the first prediction; and modify at least a portion of the second image using the translation function to create a third image in which the visual feature is exaggerated relative to the second image. In some aspects, the one or more processors are further configured to: modify at least a portion of the third image using the translation function to create a fourth image in which the visual feature is exaggerated relative to the third image. In some aspects, the translation function is generated using a generative adversarial network. In some aspects, the second image is generated using a generative adversarial network. In some aspects, the predictive model is a neural network. In some aspects, the visual feature included in the second image is created by modifying only a portion of the first image using the translation function. In some aspects, the one or more processors are further configured to identify the portion of the first image using a spatial explanation model. In some aspects, the spatial explanation model is a perturbation based model. In some aspects, the spatial explanation model is a backpropagation based model. In some aspects, the one or more processors are further configured to: generate a third prediction based on an ablated version of the first image using the predictive model, the third prediction being different than the first prediction; and identify the portion of the first image based on the ablated version of the first image.

The technology described herein can be implemented in particular ways so as to realize one or more of the following advantages.

Features in an image that result in the image being classified into a particular class by a machine-learned model may not be readily apparent to a human viewing the image. Image-to-image translation functions disclosed herein can be used to translate an image from one class to an image in another class. These image-to-image translation functions can be used to identify and enhance the features in the original image that resulted in the machine-learned classifier assigning the image to a particular class.

As an example, in the field of medical diagnostics, a physiological image of a patient may be classified by a machine-learned model as either having a particular condition or not having the condition. The features in the image resulting in such as classification may not be clearly visible or apparent to a medical practitioner viewing the image. The use of the image-to-image translation functions disclosed herein can assist in the identification and/or localization of said features, thereby allowing the medical practitioner to, for example, check that the classification is correct, and/or determine locations at which to apply therapy.

BRIEF DESCRIPTION OF THE DRAWINGS

The patent or application file contains at least one drawing executed in color. Copies of this patent or patent application

DETAILED DESCRIPTION

Overview

While various techniques have been proposed to help identify what features influence a model's prediction for a given image, existing explanation methods often focus on revealing the spatial support for a prediction. In that regard, spatial explanation methods identify one or more subsets of an image's pixels that are important to a given prediction, but do not identify what about those pixels drove the model's prediction. As such, spatial explanation methods will generally only be helpful in explaining a prediction if they highlight an area with features that are already known to be relevant to a given condition. However, if a model's prediction was driven instead by features that are not yet understood, or which are imperceptible to the human eye, it may be difficult or impossible to identify those features based solely on a spatial explanation.

In contrast, aspects of the present technology employ image translation functions to modify images and identify what types of changes influence the predictions of a given model. For example, a generative adversarial network ("GAN") may be trained using two classes of images to identify functions that convincingly translate between the two classes, and those functions can then be used to create a set of translated images to test against a predictive model. Thus, in the medical context, a GAN may be trained using a first class of images of patients who have a given medical condition, and a second class of images of patients who lack a given medical condition. Based on that training, the GAN can be configured to identify two functions F and G. Function F, when applied to images in the first class, will translate the images to make them appear more like the second class, i.e., function F will alter images diagnosed as having the medical condition to make them appear more like images that lack the medical condition. Function G, when applied to images in the second class, will translate the images to make them appear more like the first class, i.e., function G will alter images diagnosed as lacking the medical condition to make them appear more like images that have the medical condition. The translated images created by those functions can then be fed to a diagnostic model (e.g., a deep neural network trained to predict the medical condition) to see if any of the translated images results in the model changing its prediction relative to what it predicted for the corresponding untranslated image.

Because each translated image can be compared (visually or using a differencing function) against its corresponding original (untranslated) image, they can be assessed side-by-side to understand the nature of the changes that drove the altered prediction. Moreover, because the function used to create the translated image will be known, it can also be applied iteratively to the translated image to create one or more additional translated images that exaggerate or amplify those changes, and thus make their effect more apparent. Through this process, visual features that impact the model's predictions can not only be identified quantitatively (such as through the functions used to create them), but also qualitatively through visual analysis. In addition, because the present technology allows selected features to be exaggerated, it can also identify features that are predictive of a given condition even where those features would not otherwise be apparent to a human viewer (e.g., a trained physician). For example, subtle or imperceptible features that a human would otherwise miss may become apparent after iteratively applying the image translation function. Likewise, features that a human can see but would otherwise ignore as irrelevant may be highlighted, thus leading to the discovery of new indicia that have predictive value for a given condition. Those new features can then be used to generate further hypotheses to be explored and tested, thus driving scientific discovery.

Example Systems

Figure 1:
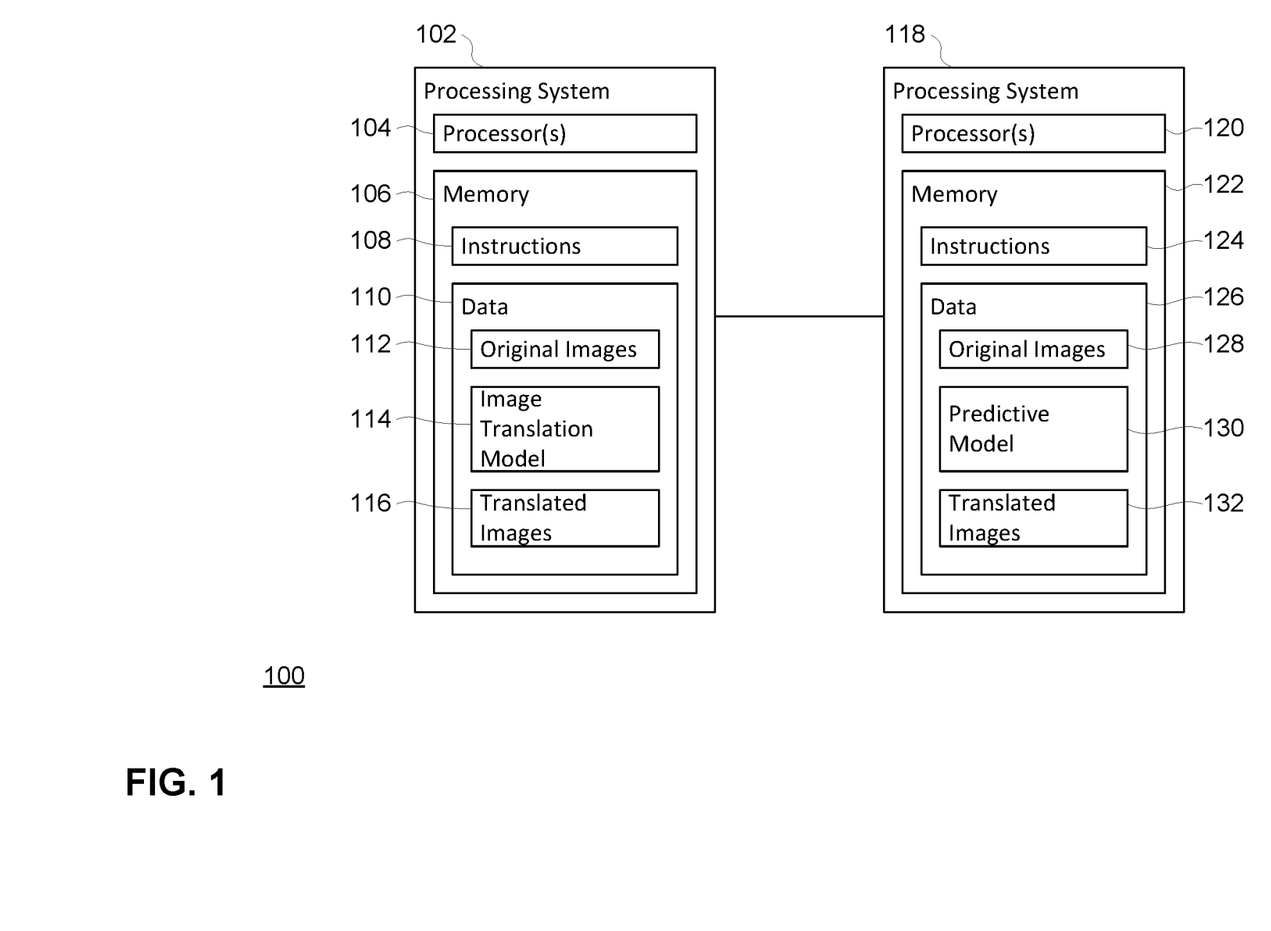
FIG. 1 is a functional diagram of an example system in accordance with aspects of the disclosure.

A high-level system diagram 100 in accordance with aspects of the technology is shown in FIG. 1. Processing system 102 includes one or more processors 104, and memory 106 storing instructions 108 and data 110. Data 110 includes a set of original images 112, an image translation model 114, and a set of translated images 116. Likewise, processing system 118 includes one or more processors 120, and memory 122 storing instructions 124 and data 126. Data 126 includes a set of original images 128, a predictive model 130, and a set of translated images 132. Processing systems 102 and 118 may be resident on separate computing devices as shown in FIG. 1, in which case they may likewise maintain separate sets of the original images (112, 128) and translated images (116, 132). However, the original images and the translated images may also be maintained on one or more separate processing systems or storage devices to which both processing systems 102 and 118 have access, such as a cloud-computing system, in which case multiple copies of the original image set and the translated image set may not be needed. Likewise, if processing systems 102 and 118 are resident on the same computing device, they may each share a single set of the original and translated images. Regardless of the topology used, it may be necessary in some circumstances to avoid connecting the image translation model 114 to the predictive model 130 in order to avoid the image translation model encoding class information directly into the translated images.

Processing system 102 and 118 may each be implemented on any type of computing device(s), such as any type of general computing device, server, or set thereof, and may further include other components typically present in general purpose computing devices or servers. Memories 106 and 122 each store information accessible by the one or more processors 104 and 120, respectively, including instructions 108 and 124 and data 110 and 126 that may be executed or otherwise used by the processor(s) 104 and 120. Memories 106 and 122 may be of any non-transitory type capable of storing information accessible by the processor(s) 104 and 120. For instance, memories 106 and 122 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Figure 2:
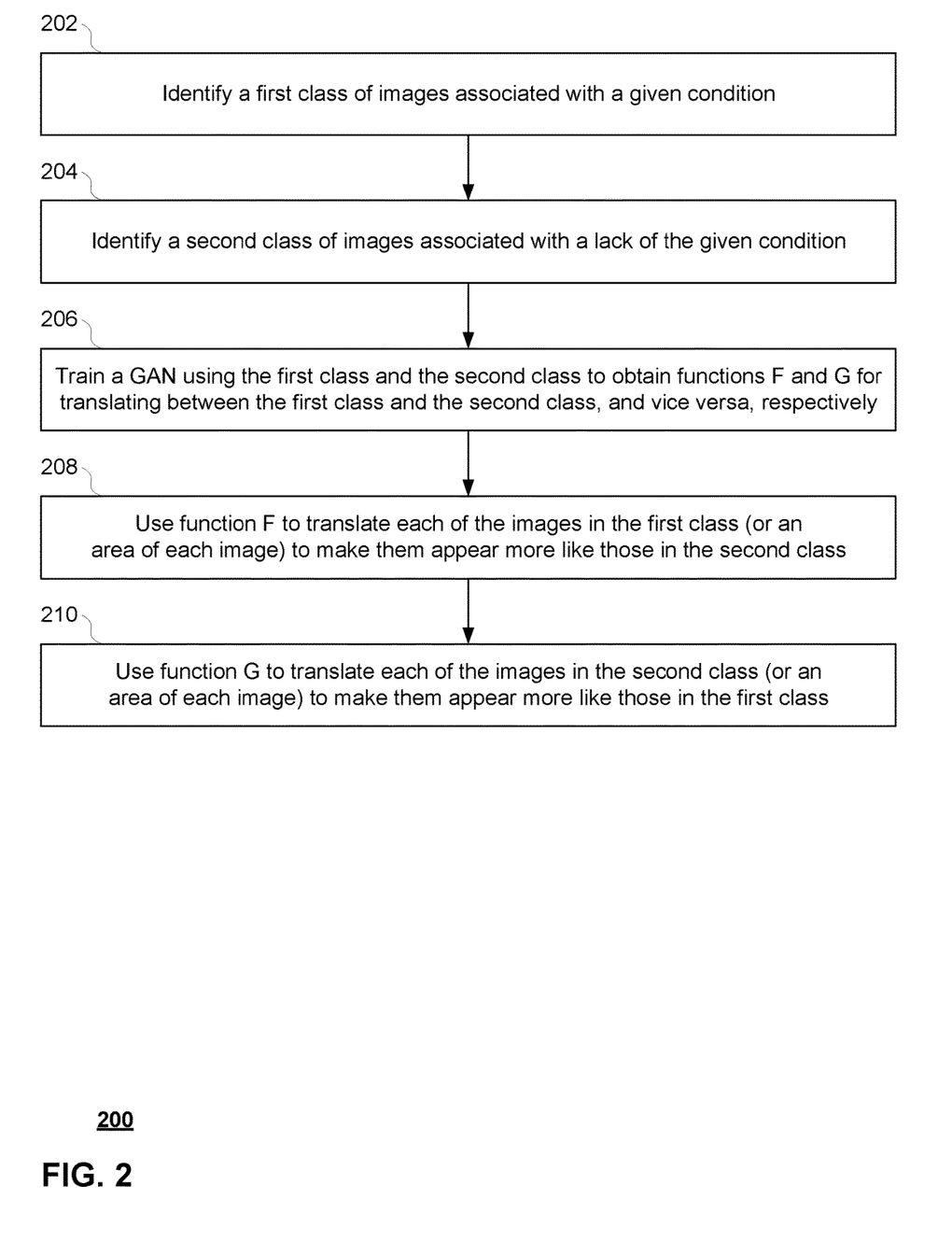
FIG. 2 is a flow diagram of an exemplary method in accordance with aspects of the disclosure.
Figure 6A:
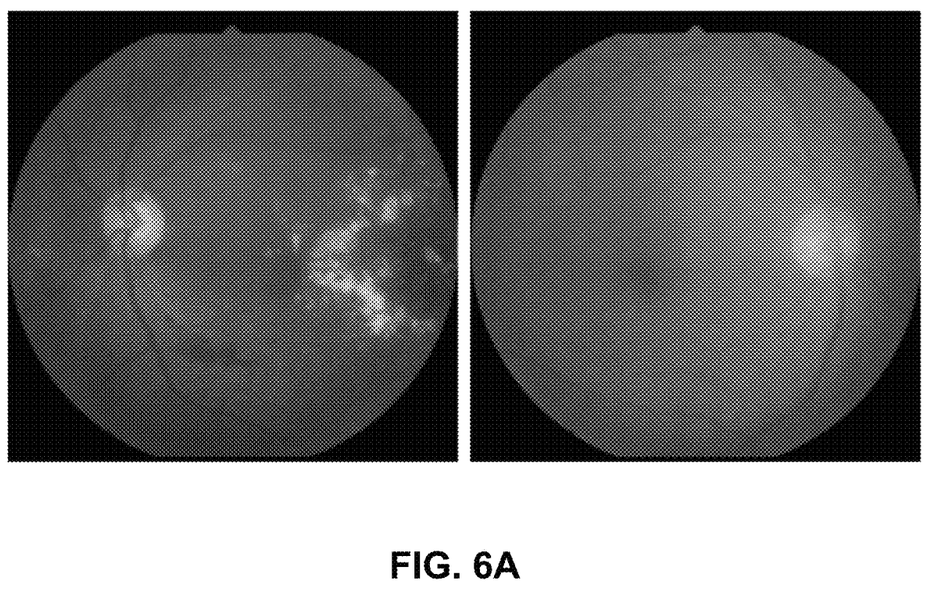
FIGS. 6A and 6B are exemplary medical images to which the present technology may be applied.

An exemplary flow diagram 200 showing how a GAN may be used to create a set of translated images is shown in FIG. 2. At step 202, a first class of images associated with a given condition is identified. This first class of images may be identified in any suitable way. For example, images in the first class may be physiological images captured from patients with a given medical condition. The physiological images may, for example, comprise any one or more of: photographic images of physiological feature of a patient (e.g. retinal images; skin images; endoscopic images etc.); x-ray images; MRI scans; and/or ultrasound images. In that regard, FIG. 6A shows a pair of exemplary color fundus photographs, which depict a portion of the retinas of two patients who have a condition known as Diabetic Macular Edema ("DME"). The images shown in FIG. 6A may be identified for inclusion in the first class because the patients were previously confirmed by a medical professional as having DME based on other tests, or on the basis of a medical professional reviewing the images and determining that they are consistent with DME based on their professional training. Alternatively, the images of FIG. 6A may be identified for inclusion in the first class by a separate machine-learning model (which itself may have been trained on images selected by medical professionals). While medical examples provide a helpful context for understanding the present technology, the systems and methods described herein can be applied to images of any type.

Figure 6B:
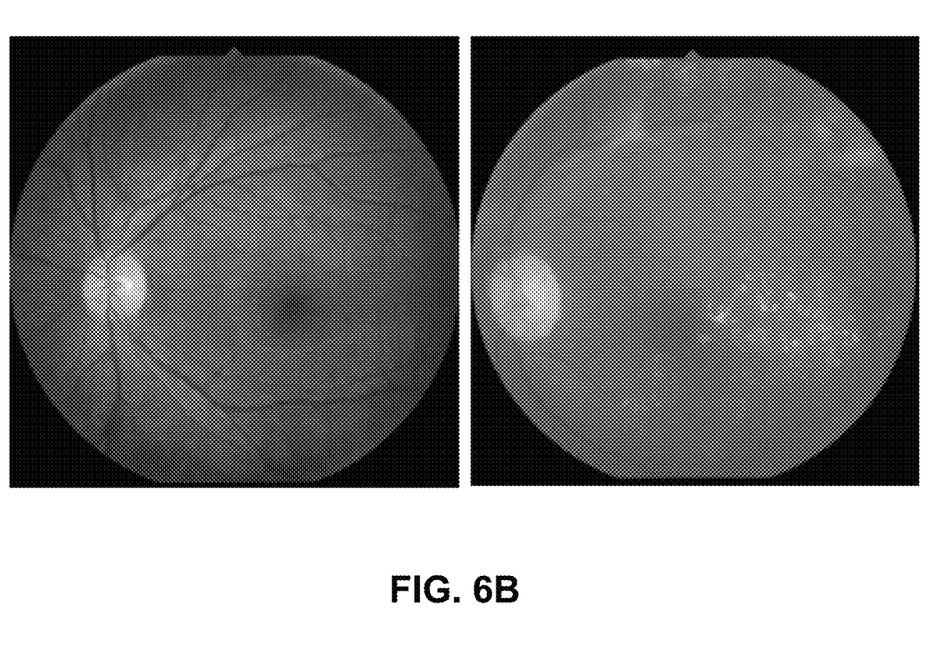

At step 204, a second class of images associated with a lack of the given condition is identified. As with the first class of images, the second class of images may also be identified in any suitable way, such as by a human or a machine-learning model. For example, images in the second class may be physiological images captured from patients without the given medical condition of patients associated with the first class. The physiological images may, for example, comprise any one or more of: photographic images of physiological feature of a patient (e.g. retinal images; skin images; endoscopic images etc.); x-ray images; MRI scans; and/or ultrasound images. In that regard, FIG. 6B shows a pair of exemplary color fundus photographs of two patients who do not have DME.

At step 206, a GAN is trained using the first and second classes of images. The GAN will produce functions F and G for translating between the first class and the second class, and vice versa. As discussed above, function F, when applied to images in the first class, will translate the images to make them appear more like the second class. Thus, in the example of FIG. 2, function F will make the images appear more like those that lack the given condition. Function G, when applied to images in the second class, will translate the images to make them appear more like the first class. Thus, in the example of FIG. 2, function G will make the images appear more like those that have the given condition. In this regard, the GAN and functions F and G together may represent the image translation model 114 of processing system 102. The GAN may be any suitable generative adversarial network trained for unpaired image-to-image translation between two image classes. Examples of such a GAN include: "CycleGAN" (described in Jun-Yon Zhu, Taesung Park, Phillip Isola, *Alexei* A. Efros, *Unpaired Image-to-Image Translation using Cycle-Consistent Adversarial Networks*, The IEEE International Conference on Computer Vision (ICCV), 2017, pp. 2223-2232, the contents of which are incorporated by reference herein); "BicycleGAN" (described in Jun-Yon Zhu, Richard Zhang, Deepak Pathak, Trevor Darrell, *Alexei* A. Efros, Oliver Wang, Eli Shechtman, *Toward Multimodal Image-to-Image Translation*, Advances in Neural Information Processing Systems 30 (NIPS 2017), the contents of which are incorporated by reference herein); "DiscoGAN" (described in Taeksoo Kim, Moonsu Cha, Hyunsoo Kim, Jungkwon Lee, Jiwon Kim, *Learning to Discover Cross-Domain Relations with Gen-* erative Adversarial Networks, Proceedings of the 34th International Conference on Machine Learning (ICML), 2017, Vol. 70, pp. 1857-1865, the contents of which are incorporated by reference herein); "StarGAN" (described in Yunjey Choi, Minje Choi, Munyoung Kim, Jung-Woo Ha, Sunghun Kim, Jaegul Choo, *StarGAN: Unified Generative Adversarial Networks for Multi-Domain Image-to-Image Translation*, The IEEE Conference on Computer Vision and Pattern Recognition (CVPR), 2018, pp. 8789-8797, the contents of which are incorporated by reference herein); etc. Notwithstanding the foregoing, as explained further below, image translation model 114 may also use other types of image translation functions, and thus does not require a GAN.

Figure 8:
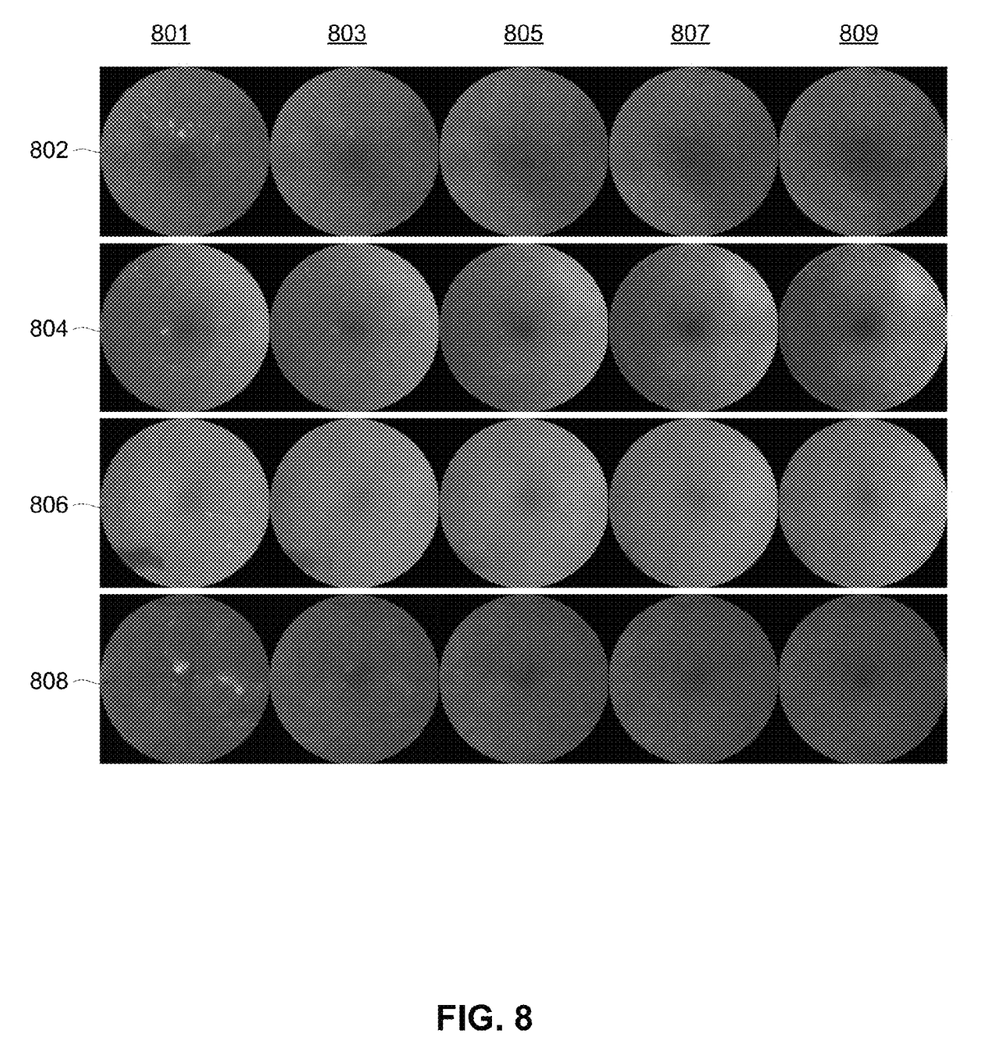
FIG. 8 illustrates arrays of exemplary medical images and iterative translated versions thereof, in accordance with aspects of the disclosure.
Figure 9:
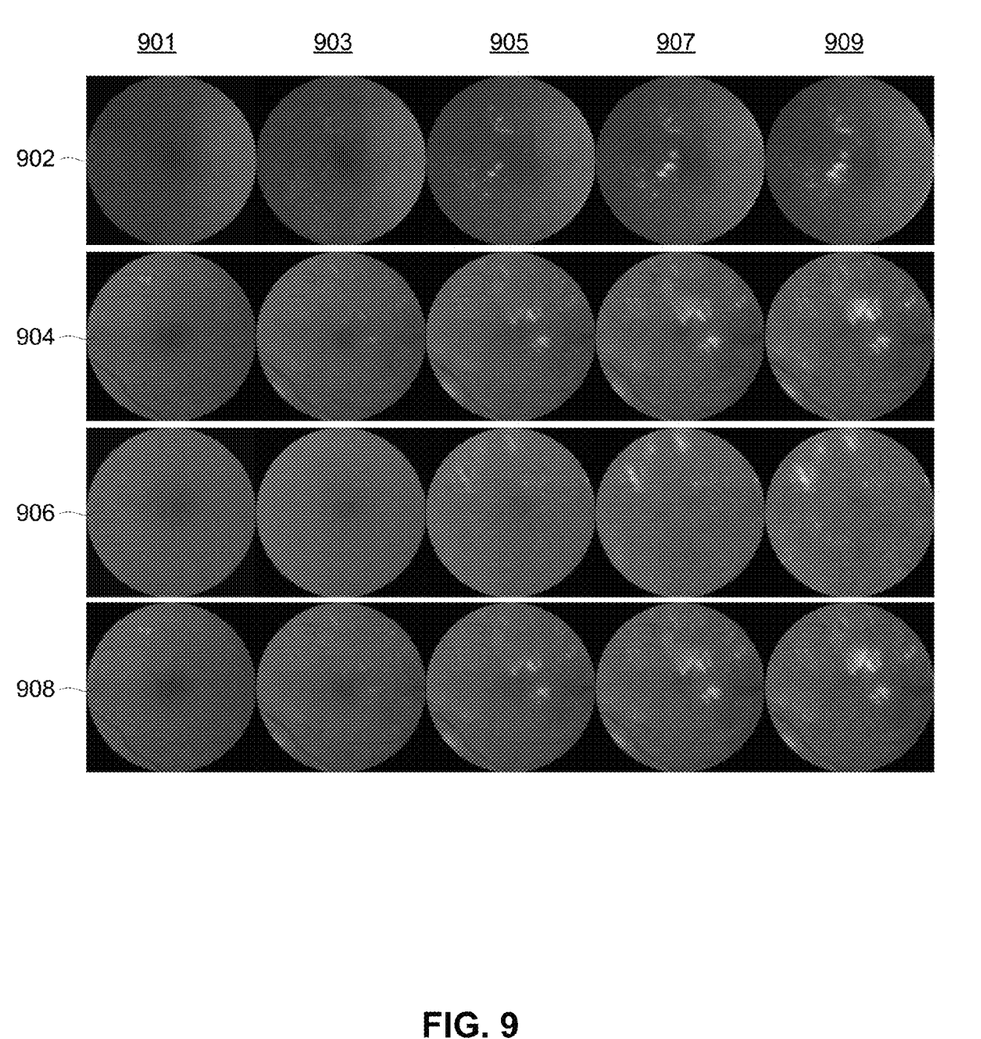
FIG. 9 illustrates arrays of exemplary medical images and iterative translated versions thereof, in accordance with aspects of the disclosure.

In step 208, one or more processors of a processing system (e.g., processors 104 of processing system 102) use function F to translate each of the images in the first class (or an area of each image) to make them appear more like those in the second class. An example of this can be seen in FIG. 8. As explained further below, column 801 of FIG. 8 shows four original color fundus photographs 802, 804, 806, and 808 of patients who have DME, and column 803 shows an example of translated images that may result from a single application of function F to those original images. Likewise, in step 210, the one or more processors use function G to translate each of the images in the second class (or an area of each image) to make them appear more like those in the first class. An example of this can be seen in FIG. 9. As explained further below, column 901 of FIG. 9 shows four original color fundus photographs 902, 904, 906, and 908 of patients who do not have DME, and column 903 shows an example of translated images that may result from a single application of function G to those original images. In both cases, while translation functions F and G may be used to translate entire images, they may alternatively be applied only to a selected portion of an image so that it is easier to identify specific changes that influenced each of the model's predictions. In that regard, in some aspects of the technology, other explanatory models and methods may be used prior to step 208 to intelligently identify specific areas of an image to be modified using translation functions F and G. Exemplary methods for doing so are described below with respect to FIGS. 3 and 4.

Figure 3:
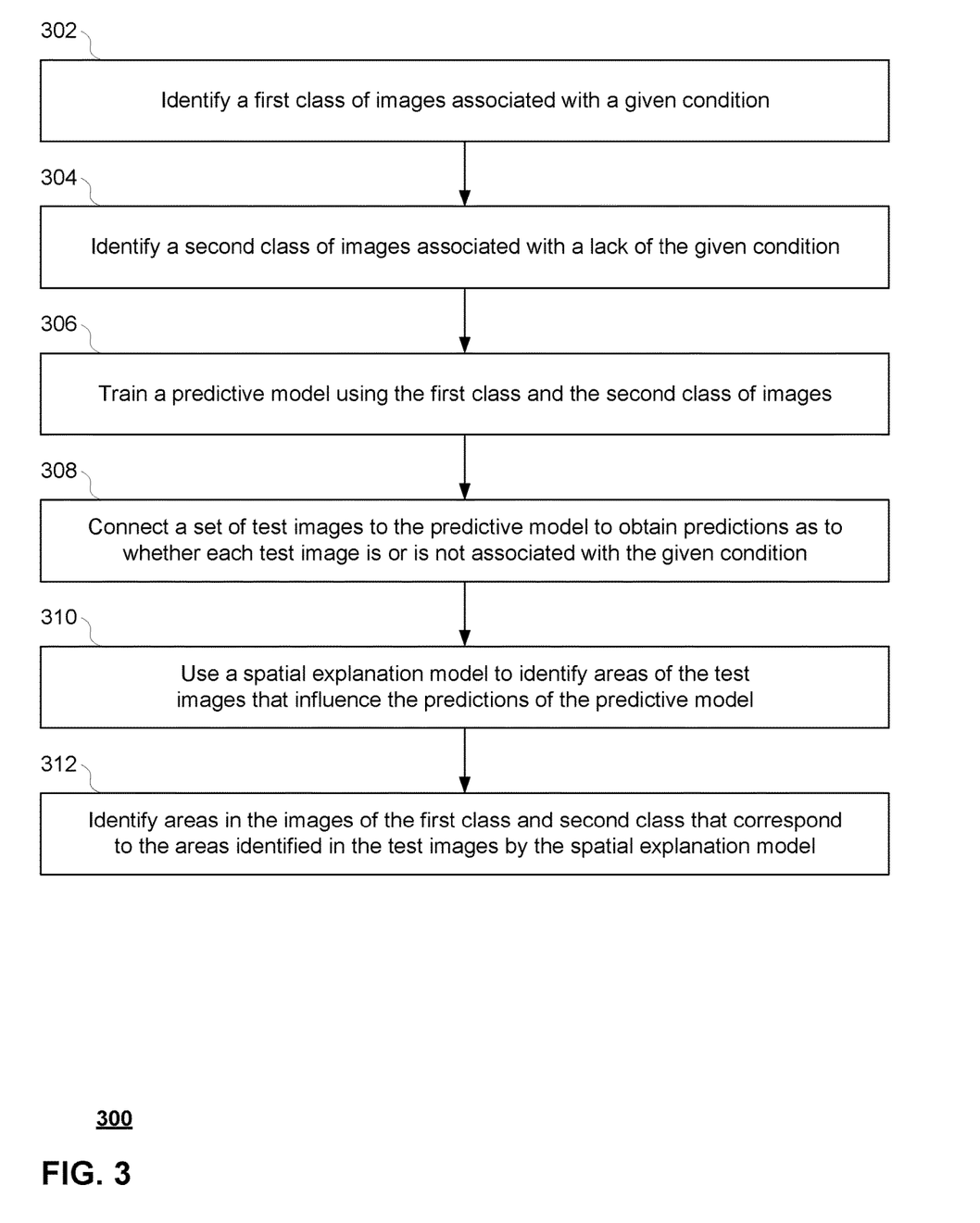
FIG. 3 is a flow diagram of an exemplary method in accordance with aspects of the disclosure.

In that regard, flow diagram 300 of FIG. 3 shows an example of how a spatial explanation model may be used to highlight areas of an image to be modified. Thus, in step 302, a first class of images associated with a given condition is identified. Likewise, in step 304, a second class of images associated with a lack of the given condition is identified. As with steps 202 and 204 of FIG. 2, the first and second classes of images described in steps 302 and 304 may be identified in any suitable way, such as by a human or a machine-learning model. Moreover, in some aspects of the technology, the processes of FIGS. 2 and 3 may use the same images for their respective first and second classes of images.

In step 306, a predictive model is trained using the first and second classes of images. For example, the predictive model may be a deep neural network such as a convolutional neural network ("CNN"), recurrent neural network ("RNN"), long short-term memory ("LSTM"), bidirectional long short-term memory ("BLSTM"), etc., and may have any suitable configuration, number of layers, number of nodes, etc. Further in that regard, the predictive model referred to in step 306 may be the predictive model 130 of FIG. 1 (and thus the same model described below with respect to the processes of FIG. 5). Alternatively, the predictive model referred to in step 306 may be a separate predictive model from the model described with respect to FIG. 5.

In step 308, a set of test images are connected to the predictive model to obtain predictions as to whether each test image is or is not associated with the given condition. In that regard, the predictive model will generate these predictions based on the various correlations it made during its training using the first and second classes of images.

In step 310, a spatial explanation model is used to identify areas of the test images that influence the predictions of the predictive model. The spatial explanation model can be any model capable of identifying pixels or portions of an image that contribute to the model's prediction. For example, the spatial explanation model may be a perturbation-based model such as "Grad-CAM" (described in Ramprasaath R. Selvaraju, Michael Cogswell, Abhishek Das, Ramakrishna Vedantam, Devi Parikh, Dhruv Batra, *Grad-CAM: Visual Explanations from Deep Networks via Gradient-based Localization*, The IEEE International Conference on Computer Vision (ICCV), 2017, pp. 618-626, the contents of which are incorporated by reference herein). As another example, the spatial explanation model may be a backpropagation-based model such as those described in Mukund Sundararajan, Ankur Taly, Qiqi Yan, *Axiomatic Attribution For Deep Networks*, Proceedings of the 34th International Conference on Machine Learning (ICML), 2017, Vol. 70, pp. 3319-3328, the contents of which are incorporated by reference herein. The spatial explanation model may be resident on the same processing system as the predictive model.

In step 312, the areas identified in the test images by the spatial explanation model are used to identify corresponding areas in the images in the first class and second class. For example, in the medical context, a medical professional may review the identified areas of the test images and determine that the areas all correspond to some identifiable feature, e.g., a particular part of the depicted anatomy. The medical professional may then identify areas that correspond to that same feature in each of the images in the first class and second class. Finally, those identified areas of each image in the first class and second class may be modified using translation functions F and G, respectively, in the same manner described above with respect to steps 208 and 210 of FIG. 2.

Figure 4:
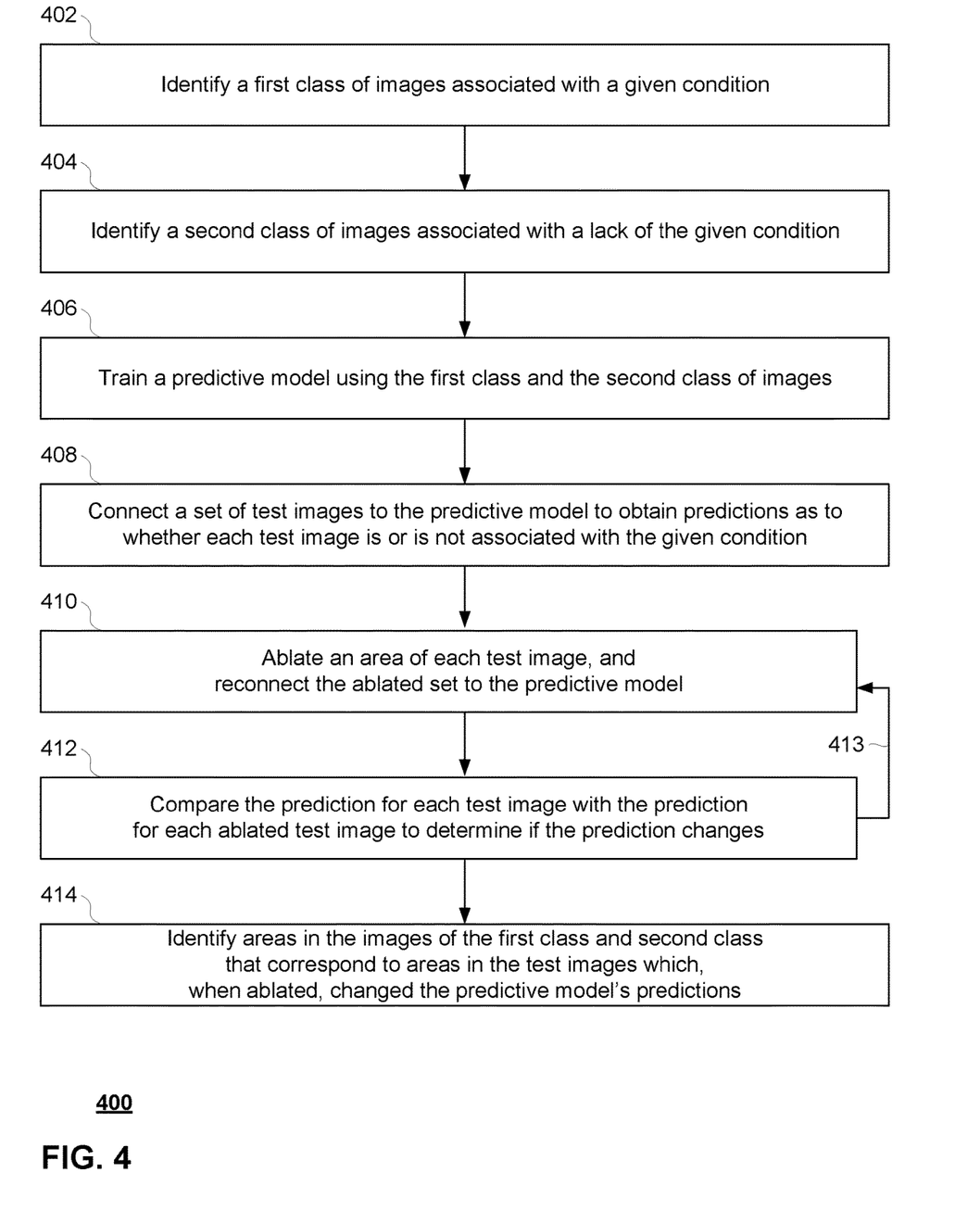
FIG. 4 is a flow diagram of an exemplary method in accordance with aspects of the disclosure.

Similarly, flow diagram 400 of FIG. 4 shows how ablation may be used to highlight areas of an image to be modified. In that regard, FIG. 4 begins the same way as FIG. 3, with steps 402, 404, 406, and 408 setting forth the same actions described above with respect to steps 302, 304, 306, and 308 of FIG. 3, respectively.

Figure 7:
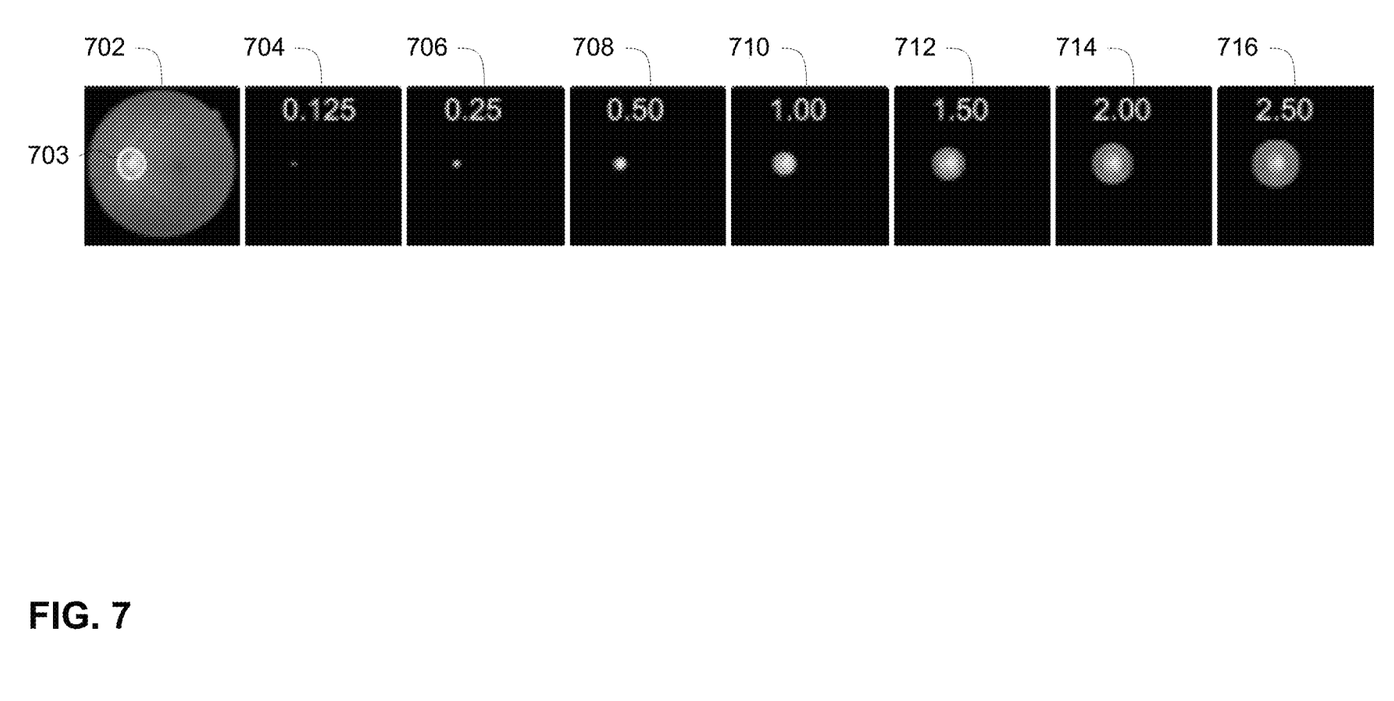
FIG. 7 depicts an exemplary medical image and ablated versions thereof, in accordance with aspects of the disclosure.

In step 410, a specific area of each test image is ablated (e.g., erased, recolored, covered over or redacted, etc.) and the ablated images are each reconnected to the predictive model to obtain a new prediction. Then, in step 412, for each test image, the prediction obtained in step 408 is compared to the prediction obtained for its corresponding ablated version in step 410. As indicated by arrow 413, steps 410 and 412 may be repeated so that multiple areas of each test image may be successively ablated and tested against the predictive model. For example, FIG. 7 shows an exemplary color fundus photograph 702, with a specific area (in this example, the optic disk 703) identified by an ellipse. Images 704, 706, 708, 710, 712, and 716 show versions of image 702 ablated in successive radii of the center of the optic disk 703. Thus, in image 704, all but the portion of image 702 that is within 0.125 of the radius of the optic disk 703 has been ablated by replacing the pixels of the image with background color. Likewise, in image 706, all but the portion of image 702 that is within 0.25 of the radius of the optic disk 703 has been ablated. Similarly, images 708, 710, 712, and 716 show ablation beyond 0.5, 1.0, 1.5, 2.0, and 2.5 times the radius of the optic disk 703, respectively.

In step 414, the areas that were found in step 412 to have changed the model's predictions are used to identify corresponding areas in the images of the first class and second class. These identified areas may then be used in the same way described above with respect to step 312 of FIG. 3. In that regard, in the exemplary medical context, a medical professional may review which areas of ablation were responsible for changing the predictive model's prediction, and determine that those areas all correspond to some identifiable feature, e.g., a particular part of the depicted anatomy. Then, the system or the medical professional may identify areas that correspond to that same feature in each of the images of the first class and second class so that those areas may be modified using translation functions F and G, respectively, in the same manner described above with respect to steps 208 and 210 of FIG. 2.

Although the exemplary flows discussed above assume that the first class and second class of images will be modified using functions generated by a GAN, the present technology is not so limited. In that regard, any function capable of translating between two classes of images can be used to generate categories of images to be tested against a predictive model. Thus, in aspects of the technology where functions F and G are not generated by a GAN, the flow 200 of FIG. 2 would merely begin with step 208.

Figure 5:
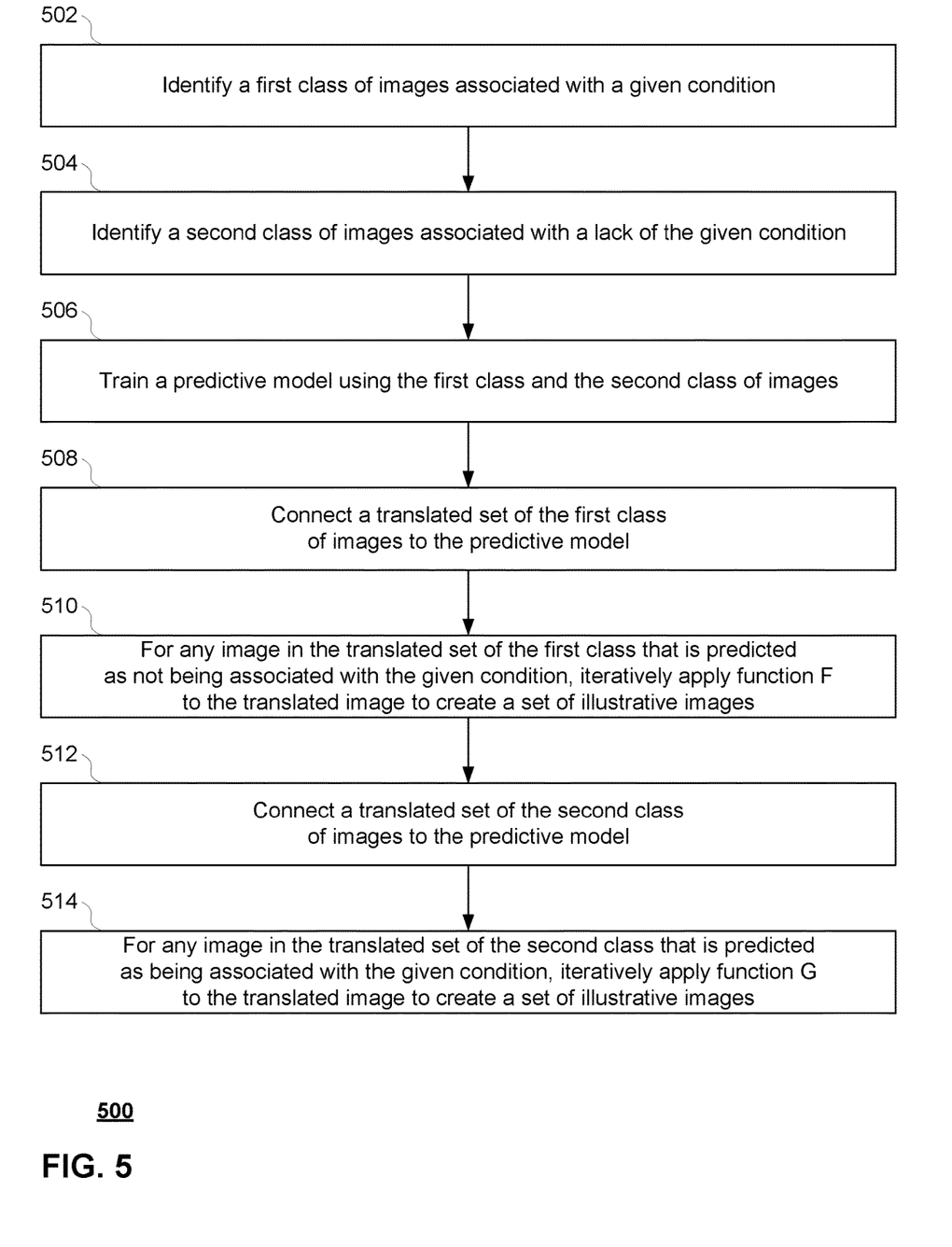
FIG. 5 is a flow diagram of an exemplary method in accordance with aspects of the disclosure.

Finally, FIG. 5 is an exemplary flow diagram 500 showing how the translated images generated in steps 208 and 210 of FIG. 2 can be tested against a predictive model to identify changes that influence the predictions, and to create a set of illustrative images that amplify those changes. FIG. 5 begins the same way as FIG. 3, with steps 502, 504, and 506 setting forth the same actions described above with respect to steps 302, 304, and 306, respectively. The predictive model referred to in step 506 is predictive model 130 of FIG. 1, and it may be any suitable model such as a deep neural network (e.g., a CNN, RNN, LSTM, BLSTM, etc.) with any suitable configuration, number of layers, number of nodes, etc. In that regard, where the optional flows of FIG. 3 or 4 are used in conjunction with flow 500, the predictive model referred to in step 506 may be the same model used in step 306 of FIG. 3 or step 406 of FIG. 4.

In step 508, a translated set of the first class of images is connected to the predictive model. The translated set of the first class of images is generated using function F as described above with respect to step 208 of FIG. 2. Thus, whereas the first class of images are all associated with a given condition, the translated images will all have been modified by function F to appear more like images that lack the given condition. The translated set of the first class of images may include a translated image for every image in the first class of images, or for some subset of the first class of images.

In step 510, if any image in the translated set of the first class of images is predicted as not being associated with the given condition, function F is then iteratively applied to that translated image to create a set of one or more additional images. This iterative application of function F may be performed by processing system 102, processing system 118, or any other processing system. Doing so creates an additional set of illustrative images in which the effect imparted by function F is amplified or exaggerated. This illustrative set can thus be used to identify the particular visual feature responsible for the making the predictive model conclude that the translated image lacked the given condition.

For example, FIG. 8 shows an iterative or successive application of function F to four different color fundus photographs. In that regard, vertical column 801 shows four original images, 802, 804, 806, and 808 of patients who have DME. Moving left to right, each next image in a given horizontal row shows an iterative or successive application of function F to that row's original image in which the images are translated to make them appear less consistent with DME. Thus, column 803 shows the translated images that result from a single application of function F to original images 802, 804, 806, and 808, respectively. Column 803 shows translated images with alterations that cause the predictive model to alter its prediction, but which may not be perceptible or obvious enough for a human to understand what has changed. Column 805 shows an application of function F to the translated images of column 803. Column 807 shows an application of function F to the translated images of column 805. Finally, column 809 shows an application of function F to the translated images of column 807. As can be seen, moving left to right within a given row, each iterative or successive application of function F makes its effects more apparent when compared to the original image of that row.

In step 512, a translated set of the second class of images is connected to the predictive model. The translated set of the second class of images is generated using function G as described above with respect to step 210 of FIG. 2. Thus, whereas the second class of images all lack the given condition, the translated images will all have been modified by function G to appear more like images associated with the given condition. Here as well, the translated set of the second class of images may include a translated image for every image in the second class of images, or for some subset of the second class of images.

In step 514, if any image in the translated set of the second class of images is predicted as being associated with the given condition, function G is then iteratively applied to that translated image to create a set of one or more additional images. Here as well, this iterative application of function G may be performed by processing system 102, processing system 118, or any other processing system. Doing so creates an additional set of illustrative images in which the effect imparted by function G is amplified or exaggerated. The illustrative set can thus be used to identify the particular visual feature responsible for the making the predictive model conclude that the translated image was associated with the given condition.

For example, FIG. 9 shows an iterative or successive application of function G to four different color fundus photographs. In that regard, vertical column 901 shows four original images, 902, 904, 906, and 908 of patients who do not have DME. Moving left to right, each next image in a given horizontal row shows an iterative or successive application of function G to that row's original image in which the images are translated to make them appear more consistent with DME. Thus, column 903 shows the translated images that result from a single application of function G to original images 902, 904, 906, and 908, respectively. Column 903 shows translated images with alterations that cause the predictive model to alter its prediction, but which may not be perceptible or obvious enough for a human to understand what has changed. Column 905 shows an application of function G to the translated images of column 903.

Column 907 shows an application of function G to the translated images of column 905. Finally, column 909 shows an application of function G to the translated images of column 907. As can be seen, moving left to right within a given row, each iterative or successive application of function G makes its effects more apparent when compared to the original image of that row.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method for identifying visual features impacting model prediction, the method comprising:
   generating, by one or more processors of a processing system, a first prediction based on a first image using a predictive model;
   generating, by the one or more processors, a second prediction based on a second image using the predictive model, wherein the second image includes a visual feature created by modifying at least a portion of the first image using a translation function, and the second prediction is different than the first prediction; and
   modifying, by the one or more processors, at least a portion of the second image using the translation function to create a third image in which the visual feature is amplified relative to the second image;
   wherein the translation function is configured to translate a first class of imagery to appear more like a second class of imagery.

2. The method of claim 1, further comprising:
   modifying, by the one or more processors, at least a portion of the third image using the translation function to create a fourth image in which the visual feature is amplified relative to the third image.

3. The method of claim 1, wherein the translation function is generated using a generative adversarial network.

4. The method of claim 1, wherein the second image is generated using a generative adversarial network.

5. The method of claim 1, wherein the predictive model is a neural network.

6. The method of claim 1, wherein the visual feature included in the second image is created by modifying only a portion of the first image using the translation function.

7. The method of claim 6, further comprising identifying, by the one or more processors, the portion of the first image using a spatial explanation model.

8. The method of claim 7, wherein the spatial explanation model is a perturbation-based model.

9. The method of claim 7, wherein the spatial explanation model is a backpropagation-based model.

10. The method of claim 6, further comprising:
    generating, by the one or more processors, a third prediction based on an ablated version of the first image using the predictive model, the third prediction being different than the first prediction; and
    identifying, by the one or more processors, the portion of the first image based on the ablated version of the first image.

11. A processing system configured to identify visual features impacting model prediction, the processing system comprising:
    a memory; and
    one or more processors coupled to the memory and configured to:
      generate a first prediction based on a first image using a predictive model;
      generate a second prediction based on a second image using the predictive model, wherein the second image includes a visual feature created by modifying at least a portion of the first image using a translation function, and the second prediction is different than the first prediction; and
      modify at least a portion of the second image using the translation function to create a third image in which the visual feature is amplified relative to the second image;
      wherein the translation function is configured to translate a first class of imagery to appear more like a second class of imagery.

12. The system of claim 11, wherein the one or more processors are further configured to:
    modify at least a portion of the third image using the translation function to create a fourth image in which the visual feature is amplified relative to the third image.

13. The system of claim 11, wherein the translation function is generated using a generative adversarial network.

14. The system of claim 11, wherein the second image is generated using a generative adversarial network.

15. The system of claim 11, wherein the predictive model is a neural network.

16. The system of claim 11, wherein the visual feature included in the second image is created by modifying only a portion of the first image using the translation function.

17. The system of claim 16, wherein the one or more processors are further configured to identify the portion of the first image using a spatial explanation model.

18. The system of claim 17, wherein the spatial explanation model is a perturbation-based model.

19. The system of claim 17, wherein the spatial explanation model is a backpropagation-based model.

20. The system of claim 16, wherein the one or more processors are further configured to:
    generate a third prediction based on an ablated version of the first image using the predictive model, the third prediction being different than the first prediction; and
    identify the portion of the first image based on the ablated version of the first image.

* * * * *